US009388275B2

United States Patent
Coulembier et al.

(10) Patent No.: US 9,388,275 B2
(45) Date of Patent: Jul. 12, 2016

(54) METHOD OF RING-OPENING POLYMERIZATION, AND RELATED COMPOSITIONS AND ARTICLES

(75) Inventors: Olivier Coulembier, Pipaix (BE); James L. Hedrick, San Jose, CA (US); Alshakim Nelson, San Jose, CA (US); Julia E. Rice, San Jose, CA (US); Daniel P. Sanders, San Jose, CA (US)

(73) Assignees: INTERNATIONAL BUSINESS MACHINES CORPORATION, Armonk, NY (US); THE UNIVERSITY OF MONS-HAINAUT (BE)

( * ) Notice: Subject to any disclaimer, the term of this patent is extended or adjusted under 35 U.S.C. 154(b) by 1162 days.

(21) Appl. No.: 12/475,700

(22) Filed: Jun. 1, 2009

(65) Prior Publication Data
US 2010/0305300 A1   Dec. 2, 2010

(51) Int. Cl.
C08G 63/08 (2006.01)
C08G 63/06 (2006.01)
C08G 63/82 (2006.01)

(52) U.S. Cl.
CPC ............. *C08G 63/823* (2013.01); *C08G 63/06* (2013.01)

(58) Field of Classification Search
USPC .......................................................... 526/242
See application file for complete search history.

(56) References Cited

U.S. PATENT DOCUMENTS

| | | | | | |
|---|---|---|---|---|---|
| 4,565,859 | A | * | 1/1986 | Murai | C08G 59/02 525/327.3 |
| 4,791,189 | A | * | 12/1988 | Yu | C08G 63/664 525/408 |
| 4,954,534 | A | * | 9/1990 | Yamamuro | C07F 7/1828 522/170 |
| 5,041,529 | A | * | 8/1991 | Shinoda | A61K 9/204 528/354 |
| 5,283,124 | A | * | 2/1994 | Fujibayashi | C07C 233/36 523/404 |
| 5,412,067 | A | * | 5/1995 | Shinoda | C08G 63/08 528/354 |
| 5,719,256 | A | * | 2/1998 | Tamai | C08G 63/823 524/714 |
| 5,747,637 | A | * | 5/1998 | Shinoda | C08G 63/08 525/408 |
| 5,889,140 | A | * | 3/1999 | Watanabe | A61K 6/10 264/236 |
| 6,114,458 | A | | 9/2000 | Hawker et al. | |
| 6,297,344 | B1 | * | 10/2001 | Hohn | C08G 59/24 523/456 |
| 6,404,068 | B1 | | 6/2002 | Tanaka et al. | |
| 6,479,592 | B2 | * | 11/2002 | Rheinberger | A61K 6/0023 525/205 |
| 6,646,103 | B1 | | 11/2003 | Le Perchec et al. | |
| 6,943,271 | B2 | | 9/2005 | Sumida et al. | |
| 7,105,618 | B2 | * | 9/2006 | Komoriya | C07C 33/46 526/242 |
| 7,160,592 | B2 | * | 1/2007 | Rypacek | A61L 31/10 424/422 |
| 7,314,267 | B2 | * | 1/2008 | Yamaguchi | B41J 2/16552 347/45 |
| 7,354,521 | B2 | * | 4/2008 | Park | B41J 2/1603 216/27 |
| 7,364,768 | B2 | * | 4/2008 | Rypacek | A61L 31/10 427/2.1 |
| 7,393,590 | B2 | | 7/2008 | Scheer et al. | |
| 7,658,469 | B2 | * | 2/2010 | Hino | B41J 2/1433 347/47 |
| 8,197,033 | B2 | * | 6/2012 | Ciampini | B41J 2/1603 347/65 |
| 8,865,392 | B2 | * | 10/2014 | Oonishi | C08G 59/687 430/18 |
| 2002/0143118 | A1 | * | 10/2002 | Rheinberger | A61K 6/0023 526/72 |
| 2003/0092867 | A1 | * | 5/2003 | Sato | C08G 18/10 528/44 |
| 2003/0219562 | A1 | * | 11/2003 | Rypacek | A61L 31/10 428/36.91 |
| 2003/0232940 | A1 | * | 12/2003 | Komoriya | C07C 33/46 526/242 |
| 2004/0002612 | A1 | * | 1/2004 | Sumida | C07C 29/00 556/127 |
| 2006/0093771 | A1 | * | 5/2006 | Rypacek | A61L 31/10 438/36.91 |
| 2006/0292485 | A1 | * | 12/2006 | Ito | G03F 7/2041 430/270.1 |
| 2007/0254235 | A1 | * | 11/2007 | Allen | G03F 7/0046 430/270.1 |
| 2008/0181927 | A1 | * | 7/2008 | Zhao | A61K 31/337 424/423 |
| 2011/0151566 | A1 | * | 6/2011 | Hedrick | C08G 63/06 435/455 |

FOREIGN PATENT DOCUMENTS

| | | | | | |
|---|---|---|---|---|---|
| IT | WO 2008006390 | A1 | * | 1/2008 | ............. B41J 2/1603 |
| JP | WO 2009123276 | A1 | * | 10/2009 | ......... C08G 59/1438 |
| WO | 2008006390 | A1 | | 1/2008 | |
| WO | WO 2008006390 | A1 | * | 1/2008 | ............. C08G 59/38 |

OTHER PUBLICATIONS

Thiourea-Based Bifunctional Organocatalysis: Supramolecular Recognition for Living Polymerization, Dove et al., JACS, Sep. 21, 2005, 127, 13798-13799.*

(Continued)

*Primary Examiner* — Peter A Salamon
(74) *Attorney, Agent, or Firm* — Cantor Colburn LLP (57) ABSTRACT

Methods to form a polymer by ring-opening polymerization include reacting, a mixture comprising a monomer, an accelerator, an initiator, and a catalyst comprising a 1,1,1,3,3,3-hexafluoropropan-2-ol-2-yl group to form the polymer. Also disclosed are polymers including a residual amount of the catalyst in an amount greater than 0 weight percent.

19 Claims, 4 Drawing Sheets

(56) References Cited

OTHER PUBLICATIONS

Thiourea-Based Bifunctional Organocatalysis: Supramolecular Recognition for Living Polymerization (Supplementary Data), Dove et al., JACS, Sep. 21, 2005, 127, 13798-13799.*

Thiourea-Based Bifunctional Organocatalysis: Dove et al. JACS, 2005, 127, 13798-13799.*

Odile Dechy-Cabaret et al, "Controlled Ring-Opening Polymerization of Lactide and Glycolide," Chem. Rev., 2004, 104 (12), 6147-6176.

Petri M. Pihko, "Activation of Carbonyl Compounds by Double Hydrogen Bonding: an Emerging Tool in Asymmetric Catalysis," Angew. Chem. Int. Ed. 2004, 43, 2062-2064.

Tehshik P. Yoon et al., "Privileged Chiral Catalysts", Science 2003, vol. 299, pp. 1691-1693; DOI: 10.1126/science.1083622.

Gregory W. Nyce et al., "In Situ Generation of Carbenes: A General and Versatile Platform for Organocatalytic Living Polymerization", J. Am. Chem. Soc. 2003, vol. 125, No. 10, pp. 3046-3056.

Szilard Csihony et al., "Single-Component Catalyst/Initiators for the Organocatalytic Ring-Opening Polymerization of Lactide", J. Am. Chem. Soc. 2005, vol. 127, No. 25, pp. 9079-9084.

Andrew P. Dove et al., "Thiourea-Based Bifunctional Organocatalysis: Supramolecular Recognition for Living Polymerization", J. Am. Chem. Soc. 2005, vol. 127, No. 40, pp. 13798-13799.

Bas G. G. Lohmeijer et al., "Guanidine and Amidine Organocatalysts for Ring-Opening Polymerization of Cyclic Esters", Macromolecules 2006, vol. 39, No. 25, pp. 8574-8583.

* cited by examiner

METHOD OF RING-OPENING POLYMERIZATION, AND RELATED COMPOSITIONS AND ARTICLES

BACKGROUND

The present disclosure relates to a method of ring-opening polymerization, and related compositions and articles.

Biodegradable polymers offer a viable alternative to commodity plastics in a number of bulk applications. Among biodegradable polymers, the best known are poly(hydroxyalkanoates) (PHAs), which can be produced on a large scale through bacterial fermentation. The most common representative of this family of biopolymers, poly-([R]-3-hydroxybutyrate) with isotactic structure, is synthesized by a variety of bacteria as a reserve energy source and possesses a remarkable feature of being totally biodegradable in various environments. The lack of commercialization of the initially promising bacterial poly(3-hydroxybutyrate-co-3-hydroxyvalerate) copolymers has been generally attributed to the high investment for the fermentation and product recovery processes on a large scale, and to the cost of the substrates.

Ring-opening polymerization (ROP) of beta-substituted propiolactones offers another approach for producing PHAs. Most efforts to date have focused on the ROP of beta-butyrolactone (b-BL) to make poly(3-hydroxybutyrate) (PHB). Unlike bacteria-mediated polymerization, which gives only isotactic PHB, controlled ROP of b-BL allows access to a variety of PHB microstructures. For example, racemic b-BL has been polymerized to make atactic PHB as well as PHB enriched in isotactic and syndiotactic diads. Optically pure b-BL can also be polymerized to make highly isotactic PHB.

With the exception of recently reported distannoxane and alkylzinc alkoxide catalysts, most systems previously studied for the ROP of b-BL are extremely slow and/or are not capable of producing high molecular weight poly(3-hydroxybutyrate) ($M_n$>100,000) in a controlled manner. Other drawbacks include the toxicity of metallic initiator residue and unwanted byproducts such as crotonates (alpha, beta-unsaturated esters formed by elimination of a carboxylate from the polymer backbone).

Thus, an ongoing challenge exists to improve the ring-opening polymerization of cyclic esters for the large scale production of biodegradable polymers.

BRIEF SUMMARY

Accordingly, in one embodiment a method comprises reacting, to form a polymer by ring-opening polymerization, a mixture comprising a cyclic ester and/or cyclic carbonate monomer, an accelerator, an initiator, and a catalyst comprising one or more 1,1,1,3,3,3-hexafluoropropan-2-ol-2-yl groups.

Also disclosed is the polymer formed by the above-described method comprising a residual amount greater than 0 wt % of the catalyst.

Further disclosed are articles comprising the polymers formed by the above-described process.

DETAILED DESCRIPTION

A method of polymerizing a monomer is disclosed herein, based on the discovery that poly-fluorinated alcohols can efficiently catalyze chain growth in a ring-opening polymerization (ROP). The monomer may be any material capable of ring-opening polymerization. More particularly, the monomer is a cyclic ester (lactones) and/or cyclic carbonate monomer. When the monomer is a cyclic ester, the resinous product is a polyester, also referred to as a poly(hydroxyalkanoate). Cyclic carbonate monomers polymerize to form polycarbonates. The ROP reaction mixture also includes an initiator, for example a second non-fluorinated alcohol, and an accelerator, for example a nitrogen base. A solvent is optional. Polymers having different tacticities can be prepared in high yield under mild conditions and/or in relatively short reaction times compared to ring-opening polymerizations of cyclic monomers using other catalysts. The resinous products disclosed herein are "living" polymers, capable of undergoing chain growth in a stepwise manner using either the same monomer or a different monomer. The method makes possible a large variety of bio-degradable polymers suitable for a variety of applications including but not limited to medical and packaging applications.

The ring-opening polymerization of lactide (LA) to polylactide (PLA) in Scheme 1 below illustrates one poly(hydroxyalkanoate) that can be formed by the method (optical centers not shown).

Scheme 1.

Lactide    Polylactide

In this example, the initiator is phenol which becomes an endgroup in the polylactide chain. D-lactide, L-lactide, racemic D,L-lactide (a 1:1 mixture of D and L forms), and meso-lactide (having two centers of opposite symmetry, R and S) can be polymerized by this method. The catalyst comprises at least one 1,1,1,3,3,3-hexafluoropropan-2-ol-2-yl (HFP) group. Singly-donating hydrogen bond catalysts have the formula (1):

$R^1$ represents a hydrogen or a substituent having from 1 to 20 carbons, for example an alkyl group, substituted alkyl group, cycloalkyl group, substituted cycloalkyl group, heterocycloalkyl group, substituted heterocycloalkyl group, aryl group, substituted aryl group, or a combination thereof. Exemplary singly-donating hydrogen bonding catalysts are listed in Table 1.

TABLE 1

Doubly-donating hydrogen bonding catalysts have two HFP groups, represented by the general formula (2):

$R^2$ is a bridging group having a valence of 2 containing from 1 to 20 carbons, such as an alkylene group, a substituted alkylene group, a cycloalkylene group, substituted cycloalkylene group, a heterocycloalkylene group, substituted heterocycloalkylene group, an arylene group, a substituted arylene group, and a combination thereof. Representative double hydrogen bonding catalysts of formula (2) include those listed in Table 2. In a specific embodiment, $R^2$ is an arylene or substituted arylene group, and the HFP groups occupy positions meta to each other on the aromatic ring.

TABLE 2

In one embodiment, the catalyst is selected from the group consisting of 4-HFA-St, 4-HFA-Tol, HFTB, NFTB, HFIP, 3,5-HFA-MA, 3,5-HFA-St, 1,3-HFAB, 1,4-HFAB, and a combination comprising at least one of the foregoing catalysts.

Also contemplated are catalysts comprising HFP-containing groups bound to a support. In one embodiment, the support comprises a polymer, a crosslinked polymer bead, an inorganic particle, or a metallic particle. HFP-containing polymers can be formed by known methods including direct polymerization of an HFP-containing monomer (for example, the methacrylate monomer 3,5-HFA-MA or the styryl monomer 3,5-HFA-St). Functional groups in HFP-containing monomers that can undergo direct polymerization (or polymerization with a comonomer) include acrylate, methacrylate, α,α,α-trifluoromethacrylate, α-halomethacrylate, acrylamido, methacrylamido, norbornene, vinyl, vinyl ether, and other groups known in the art. Typical examples of such polymerizeable HFP-containing monomers may be found in: Ito et al. *Polym. Adv. Technol.* 2006, 17 (2), 104-115, Ito et al. *Adv. Polym. Sci.* 2005, 172, 37-245, Ito et al. US20060292485, Maeda et al. WO2005098541, Allen et al. US20070254235, and Miyazawa et al. WO2005005370. Alternatively, pre-formed polymers and other solid support surfaces can be modified by chemically bonding an HFP-containing group to the polymer or support via a linking group. Examples of such polymers or supports are referenced in M. R. Buchmeiser, ed. "Polymeric Materials in Organic Synthesis and Catalysis," Wiley-VCH, 2003, M. Delgado and K. D. Janda "Polymeric Supports for Solid Phase Organic Synthesis," *Curr. Org. Chem.* 2002, 6 (12), 1031-1043, A. R. Vaino and K. D. Janda "Solid Phase Organic Synthesis: A Critical Understanding of the Resin", *J. Comb. Chem.* 2000, 2 (6), 579-596, D. C. Sherrington "Polymer-supported Reagents, Catalysts, and Sorbents: Evolution and Exploitation—A Personalized View," *J. Polym. Sci. A. Polym. Chem.* 2001, 39 (14), 2364-2377, and T. J. Dickerson et al. "Soluble Polymers as Scaffold for Recoverable Catalysts and

Reagents," *Chem. Rev.* 2002, 102 (10), 3325-3343. Examples of linking groups include $C_1$-$C_{12}$ alkyl, a $C_1$-$C_{12}$ heteroalkyl, ether group, thioether group, amino group, ester group, amide group, or a combination thereof. Also contemplated are catalysts comprising charged HFP-containing groups bound by ionic association to oppositely charged sites on a polymer or a support surface.

Examples of cyclic ester and cyclic carbonate monomers are listed in Table 3. The monomers can be used alone or in combination.

TABLE 3

R = H; n = 1: beta-Propiolactone, (b-PL)
R = H; n = 2: gamma-Butyrolactone, (g-BL)
R = H; n = 3: delta-Valerolactone, (d-VL)
R = H; n = 4: epsilon-Caprolactone, (e-CL)
R = CH$_3$; n = 1: beta-Butyrolactone, (b-BL)
R = CH$_3$; n = 2: gamma-Valerolactone, (g-VL)

Pivalolactone
(PVL)

D-Lactide, (D-LA),
L-Lactide, (L-LA), or
racemic Lactide, 1:1 D:L forms, (D, L-LA)

(mes-Lactide, (meso-LA)
(two opposite centers of asymmetry, R and S)

Glycolide
(GLY)

(Z)-6,7-Dihydrooxepin-2(3H)-one
(DHXO)

1,5-Dioxepan-2-one
(DXO)

5-(Benzyloxy)oxepan-2-one
(BXO)

TABLE 3-continued

7-Oxooxepan-4-yl 2-bromo-2-methylpropanoate (BMP-XO)

5-Phenyloxepan-2-one (PXO)

5-Methyloxepan-2-one (MXO)

1,4,8-Trioxa(4,6)spiro-9-undecane (TOSUO)

5-(Benzyloxymethyl)oxepan-2-one (BOMXO)

7-Oxooxepan-4-yl 3-hydroxy-2-(hydroxymethyl)-2-methylpropanoate (OX-BHMP)

m = 1, Trimethylene carbonate, (TMC)
m = 2, Tetramethylene carbonate, (TEMC)
m = 3, Pentamethylene carbonate, (PMC)

R = hydrogen, (MODC-A)
R = methyl, (MODC-M)
R = t-butyl, (MODC-TB)
R = ethyl, (MODC-E)

In a specific embodiment, the monomer is a lactide, beta-butyrolactone, gamma-butyrolactone, gamma-valerolactone, delta-valerolactone, epsilon-caprolactone, or a combination thereof. Even more specifically, the monomer is a lactide, such as D-LA, L-LA, meso-LA, or a combination comprising at least one of the foregoing lactides.

In another specific embodiment, the cyclic carbonate is selected from the group consisting of trimethylenecarbonate, tetramethylene carbonate, pentamethylene carbonate, MODC-A, MODC-M, MODC-TB, MODC-E and a combination comprising at least one of the foregoing cyclic carbonates.

The above monomers can be purified by recrystallization from a solvent such as ethyl acetate or by other known methods of purification, with particular attention being paid to removing as much water as possible from the monomer. The monomer moisture content can be from 1 to 10,000 ppm, 1 to 1,000 ppm, 1 to 500 ppm, and most specifically 1 to 100 ppm, by weight of the monomer.

The polymerization is conducted in the presence of an accelerator, in particular a nitrogen base. Exemplary nitrogen bases are listed below and include pyridine (Py), N,N-dimethylaminocyclohexane (Me₂NCy), 4-N,N-dimethylaminopyridine (DMAP), trans 1,2-bis(dimethylamino)cyclohexane (TMCHD), 1,8-diazabicyclo[5.4.0]undec-7-ene (DBU), 1,5,7-triazabicyclo[4.4.0]dec-5-ene (TBD), 7-methyl-1,5,7-triazabicyclo[4.4.0]dec-5-ene (MTBD), (−)-sparteine, (Sp) 1,3-bis(2-propyl)-4,5-dimethylimidazol-2-ylidene (Im-1), 1,3-bis(2,4,6-trimethylphenyl)imidazol-2-ylidene (Im-2), 1,3-bis(2,6-di-i-propylphenyl(imidazol-2-ylidene (Im-3), 1,3-bis(1-adamantyl)imidazol-2-ylidene (Im-4), 1,3-di-i-propylimidazol-2-ylidene (Im-5), 1,3-di-t-butylimidazol-2-ylidene (Im-6), 1,3-bis(2,4,6-trimethylphenyl)-4,5-dihydroimidazol-2-ylidene (Im-7), 1,3-bis(2,6-di-i-propylphenyl)-4,5-dihydroimidazol-2-ylidene, 1,3-bis(2,6-di-i-propylphenyl)-4,5-dihydroimidazol-2-ylidene (Im-8) or a combination thereof, shown in Table 4.

TABLE 4

Pyridine
(Py)

N,N-Dimethylaminocyclohexane
(Me₂NCy)

4-N,N-Dimethylaminopyridine
(DMAP)

trans 1,2-Bis(dimethylamino)cyclohexane
(TMCHD)

1,8-Diazabicyclo[5.4.0]undec-7-ene
(DBU)

7-Methyl-1,5,7-triazabicyclo[4.4.0]dec-5-ene
(MTBD)

1,5,7-Triazabicyclo[4.4.0]dec-5-ene
(TBD)

(−)-Sparteine
(Sp)

1,3-Bis(2-propyl)-4,5-dimethylimidazol-2-ylidene
(Im-1)

1,3-Bis(2,4,6-trimethylphenyl)imidazol-2-ylidene
(Im-2)

TABLE 4-continued

In one embodiment, the base has two or three nitrogens, each capable of participating as a Lewis base, as for example in the structure (−)-sparteine. Stronger bases generally improve the polymerization rate. Table 5 lists the pKa for the protonated form of several of the above listed bases, designated pKa[base-H$^+$], in acetonitrile (CH$_3$CN), dimethylsulfoxide (DMSO), and tetrahydrofuran (THF).

TABLE 5

| Base | pKa[base-H$^+$] (CH$_3$CN) | pKa[base-H$^+$] (DMSO) | pKa[base-H$^+$] (THF) |
|---|---|---|---|
| TBD | 26.0 | | 21.0 |
| MTBD | 25.5 | | 17.9 |
| DBU | 24.3 | 13.9 | 16.8 |
| Im-1 | 35.8 | 24.5 | |
| Im-2 | 28.2 | 16.8 | |

The ROP reaction mixture also includes an initiator, in particular a second alcohol different from the catalyst. The alcohol initiator can be any suitable alcohol, including mono-alcohol, diol, triol, or other polyol, with the proviso that the choice of alcohol does not adversely affect the polymerization yield, polymer molecular weight, and/or the desirable mechanical and physical properties of the product polymer. With this proviso in mind, the alcohol can also be multi-functional comprising, in addition to one or more hydroxyl groups, a halide, an ether group, an ester group, an amide group, or other functional group. Exemplary alcohols includes methanol, ethanol, propanol, butanol, pentanol, amyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol and other aliphatic saturated alcohols, cyclopentanol, cyclohexanol, cycloheptanol, cyclooctanol and other aliphatic cyclic alcohols; phenol, substituted phenols, benzyl alcohol, substituted benzyl alcohol, benzenedimethanol, trimethylolpropane, a saccharide, poly(ethylene glycol), propylene glycol, alcohol functionalized block copolymers derived from oligomeric alcohols, or alcohol functionalized branched polymers derived from branched alcohols, or a combination thereof.

The reaction can be performed with or without the use of a solvent. Optional solvents include dichloromethane, chloroform, benzene, toluene, xylene, chlorobenzene, dichlorobenzene, benzotrifluoride, petroleum ether, acetonitrile, pentane, hexane, heptane, 2,2,4-trimethylpentane, cyclohexane, diethyl ether, t-butyl methyl ether, diisopropyl ether, dioxane, tetrahydrofuran, or a combination comprising one of the foregoing solvents. When a solvent is present, a suitable monomer concentration is about 0.1 to 5 moles per liter, and more particularly about 0.2 to 4 moles per liter. In a specific embodiment, the ring-opening polymerization mixture is free of a solvent.

The polymerization can be performed at a temperature that is about ambient temperature or higher, more specifically a temperature from 15° C. to 200° C., and more particularly 20° C. to 200° C. When the reaction is conducted in bulk, the polymerization is performed at a temperature of 50° C. or higher, and more particularly 100° C. to 200° C. Reaction times vary with solvent, temperature, agitation rate, pressure, and equipment, but in general the polymerizations are complete within 1 to 100 hours.

Whether performed in solution or in bulk, the polymerizations are conducted in an inert (i.e., dry) atmosphere and at a pressure of from 100 to 500 MPa (1 to 5 atm), more typically at a pressure of 100 to 200 MPa (1 to 2 atm). At the completion of the reaction, the solvent can be removed using reduced pressure.

The catalyst is present in an amount of about 0.2 to 20 mol %, 0.5 to 10 mol %, 1 to 5 mol %, and 1 to 2.5 mol %, based on moles of the monomer.

The nitrogen base accelerator is present in an amount of 0.1 to 5.0 mol %, 0.1 to 2.5 mol %, 0.1 to 1.0 mol %, and 0.2 to 0.5 mol %, based on moles of the monomer.

The amount of initiator is calculated based on the equivalent molecular weight per hydroxyl group in the alcohol initiator. The hydroxyl groups are present in an amount of 0.001 to 10.0 mol %, 0.1 to 2.5 mol %, 0.1 to 1.0 mol %, and 0.2 to 0.5 mol %, based on moles of monomer. For example, if the molecular weight of the initiator is 100 g/mole and the initiator has 2 hydroxyl groups, the equivalent molecular weight per hydroxyl group is 50 g/mole. If the polymerization calls for 5 mol % hydroxyl groups per mole of monomer, the amount of initiator is 0.05×50=2.5 g per mole of monomer.

In a specific embodiment, the catalyst is present in an amount of about 0.2 to 20 mol %, the nitrogen base accelerator is present in an amount of 0.1 to 5.0 mol %, and the hydroxyl groups of the initiator are present in an amount of 0.1 to 5.0 mol % based on the equivalent molecular weight per hydroxyl group in the initiator.

Also disclosed are the polymers formed by the above described method. The polymers have a number-average molecular weight as determined by size exclusion chromatography of at least 2500 g/mol, more specifically 4000 g/mol to 150000 g/mol, and even more specifically 10000 g/mol to 50000 g/mol. The polymers also have a narrow polydispersity index (PDI), generally 1.01 to 1.35, more particularly 1.01 to 1.10, and even more particularly 1.01 to 1.08. In one embodiment the polymer is a polyester, polyester copolymer, a polycarbonate, a polycarbonate copolymer, or a polyester-polycarbonate copolymer. In one embodiment the polymer is isotactic, atactic, or syndiotactic polylactide. The polymer can comprise a residual amount of the catalyst in an amount greater than 0 wt %. The amount of residual catalyst can also be less than 20 wt %, less than 15 wt %, less than 10 wt %, less than 5 wt %, less than 1 wt %, and most specifically less than 0.5 wt % based on the total weight of the polymer and the catalyst. The catalysts can be removed by selective precipitation or in the case of the solid supported catalysts, simply by filtration.

Also disclosed is a polymer derived from a cyclic ester or a cyclic carbonate comprising a residual amount of a catalyst comprising one or more 1,1,1,3,3,3-hexafluoropropan-2-ol-2-yl groups, in an amount greater than 0 wt %. The residual amount of the catalyst can advantageously influence one or more properties, including surface properties, mechanical properties, adhesion properties, and hydrolytic aging properties of the polymer.

Further disclosed are articles comprising the polymers formed by the above described method.

The following examples further illustrate the method.

EXAMPLES

Catalyst Hydrogen Bonding Activity

Figure 1:
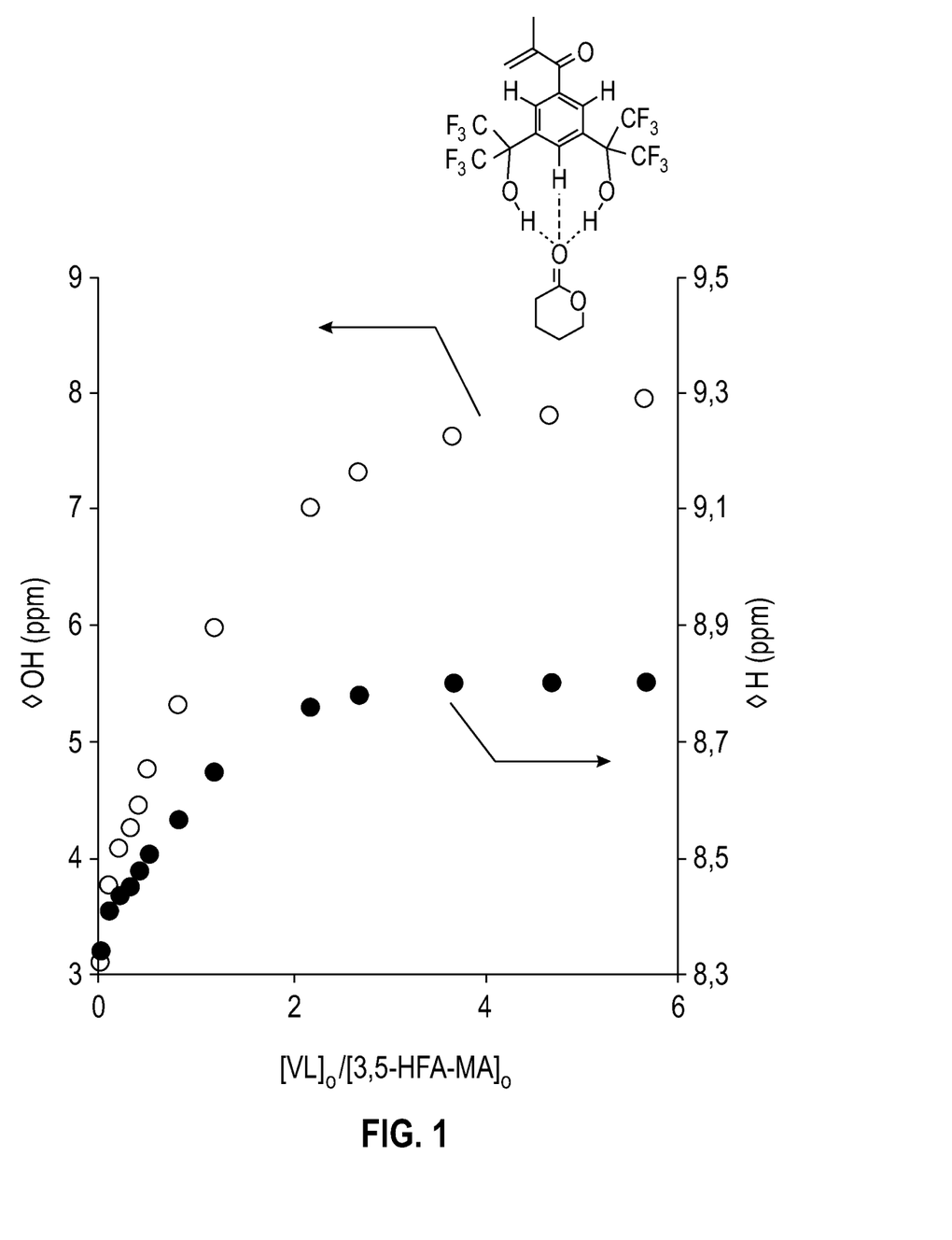
FIG. 1 is a graph of the $^1$H chemical shifts observed by titration of with 3,5-HFA-MA with delta-valerolactone (d-VL) (solvent $C_6D_6$).

The hydrogen bonding capabilities of the catalysts, the principal interaction site, and the average complexation number were characterized primarily by correlation of $^1$H- and $^{13}$C-NMR spectroscopy data, and in one case the results were supplemented by cryometric analysis. FIG. 1 shows the changes in chemical shifts observed for 3,5-HFA-MA resonances upon the addition of valerolactone in $C_6D_6$. The OH groups of the doubly hydrogen bonding catalyst are most effected by the addition of valerolactone as indicated by the large change in chemical shift of the OH peak (delta ppm=4.82). This suggests that a strong hydrogen bonding interaction is taking place, wherein the carbonyl of the valerolactone is bifurcated by the two OH functionalities. The proximity of the valerolactone of the aromatic methine during the hydrogen bonding interaction also causes a downfield shift of the methine resonance. Similar results were observed for the singly-donating hydrogen bond catalysts (not shown here).

Figure 2:
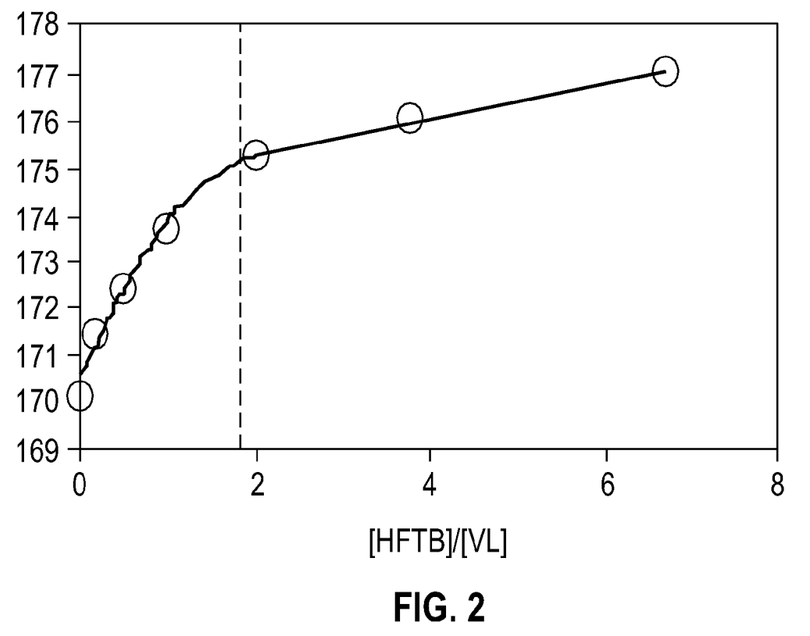
FIG. 2 is a graph of the $^{13}$C chemical shifts observed by titration of delta-valerolactone with HFTB (solvent $C_6D_6$).
Figure 3:
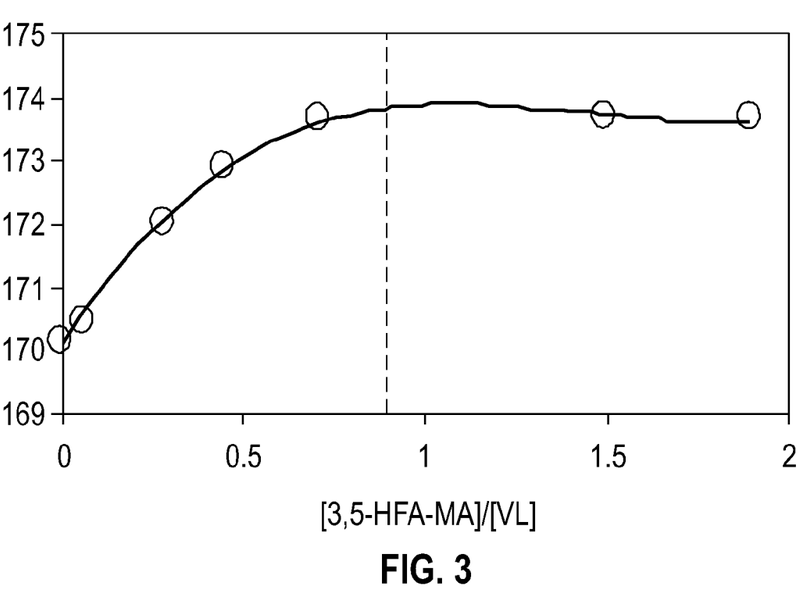
FIG. 3 is a graph of the $^{13}$C chemical shifts observed by titration of delta-valerolactone with 3,5-HFA-MA (solvent $C_6D_6$).

$^{13}$C-NMR spectroscopy is particularly well suited for identifying complexes formed by hydrogen bonding interactions. FIGS. 2 and 3 show the dependence of the (VL) carbonyl shift as a function of $[catalyst]_0/[VL]_0$ in the same solvent system, for catalysts 3,5-HFA-MA and HFTB. Both evolutions show a large downfield shift in the carbonyl signal with increasing concentration of the catalysts. Maximum displacements of the carbonyl signal were observed for catalyst-to-VL mole ratios of 2 and 0.85 for catalysts HMP and 3,5-HFA-MA, respectively.

These results strongly suggest that HFTB interacts with valerolactone in a 2:1 ratio, and that 3,5-HFA-MA interacts with valerolactone in a 1:1 ratio. The 2:1 average state of complexation for 3,5-HFA-MA with valerolactone was also confirmed by cryometric analysis.

Polymerization Examples 1 to 50

The following polymerizations were performed in an inert atmosphere glovebox using previously dried vials. Conversions and targeted degrees of polymerization (DP) were followed by $^1$H-NMR spectroscopy. The DP in the Tables 1 and 2 is the targeted DP. Number average molecular weight, $M_n$, was determined by size exclusion chromatography (SEC) and is referred to as MnSEC. Polydispersity index (PDI) was also determined by SEC in THF at 27° C. Yields have been obtained by gravimetry.

Examples 1 to 10 were performed using L-Lactide (LA), in dichloromethane at ambient temperature. The target degree of polymerization (DP) was 200. In the examples, M/C refers to the monomer to catalyst molar ratio. M/I refers to the monomer to initiator molar ratio.

Example 1

L-LA (266 mg, 1.9 mmol), (−)-sparteine (2.2 microliter, 0.009 mmol) and 3,5-HFA-MA (21 mg, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=45. M/I=211. The polymerization was followed by $^1$H-NMR and stopped after 91 hours by ultra-fast evaporation of the solvent. Conversion=68%, MnSEC=21255 g/mol, PDI=1.09.

Example 2

L-LA (266 mg, 1.9 mmol), (−)-sparteine (2.2 microliter, 0.009 mmol) and 3,5-HFA-St (20.2 mg, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol).

M/C=45. M/I=211. The polymerization was followed by $^1$H-NMR and stopped after 91 hours by ultra-fast evaporation of the solvent. Conversion=95%, MnSEC=27458 g/mol, PDI=1.08.

Example 3

L-LA (293 mg, 2.0 mmol), (−)-sparteine (2.2 microliter, 0.009 mmol) and 4-HFA-St (12.5 mg, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=48. M/I=222. The polymerization was followed by $^1$H-NMR and stopped after 91 hours by ultra-fast evaporation of the solvent. Conversion=54%, MnSEC=20289 g/mol, PDI=1.09.

Example 4

L-LA (266 mg, 1.9 mmol), (−)-sparteine (2.2 microliter, 0.009 mmol) and NFTB (11 mg, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=45. M/I=211. The polymerization was followed by $^1$H-NMR and stopped after 143 hours by ultra-fast evaporation of the solvent. Conversion=0%.

Example 5

L-LA (266 mg, 1.9 mmol), (−)-sparteine (2.2 microliter, 0.009 mmol) and HFTB (6 microliter, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=45. M/I=211. The polymerization was followed by $^1$H-NMR and stopped after 71.2 hours by ultra-fast evaporation of the solvent. Conversion=88%, MnSEC=30479 g/mol, PDI=1.12.

Example 6

L-LA (266 mg, 1.9 mmol), (−)-sparteine (2.2 microliter, 0.009 mmol) and HFTB (600 microliter, 4.2 mmol) were dissolved in $CH_2Cl_2$ (0.9 g). The mixture was allowed to dissolve for two minutes in a screwed capped vial before the addition of benzyl alcohol (1.0 microliter, 0.009 mmol). M/C=0.45. M/I=211. The polymerization was followed by $^1$H-NMR and stopped after 26 hours by ultra-fast evaporation of the solvent. Conversion=12.7%, MnSEC=3252 g/mol, PDI=1.08.

Example 7

L-LA (266 mg, 1.9 mmol), (−)-sparteine (2.2 microliter, 0.009 mmol) and 1,1,1,3,3,3-hexafluoro-2-propanol (HFIP) (5 microliter, 0.042 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=45. M/I=211. The polymerization was followed by $^1$H-NMR and stopped after 23 hours by ultra-fast evaporation of the solvent. Conversion=91%, MnSEC=12864 g/mol, PDI=1.28. In the example, co-initiation from the catalyst was observed by $^1$H-NMR of the hydrogen of the 1,1,1,3,3,3-hexafluoropropan-2-ol-2-yl group in the formula: $HC(CF_3)_2$—OC(O)PLA-OH, observed at 5.75 ppm (solvent $CDCl_3$).

Example 8

L-LA (266 mg, 1.9 mmol), (−)-sparteine (2.2 microliter, 0.009 mmol) and 1,4-HFAB (19 mg, 0.046 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=41. M/I=211. The polymerization was followed by $^1$H-NMR and stopped after 72 hours by ultra-fast evaporation of the solvent. Conversion=29.6%, MnSEC=5905 g/mol, PDI=1.07.

Example 9

L-LA (266 mg, 1.9 mmol), (−)-sparteine (2.2 microliter, 0.009 mmol) and 1,3-HFAB (19 mg, 0.046 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=41. M/I=211. The polymerization was followed by $^1$H-NMR and stopped after 47.3 hours by ultra-fast evaporation of the solvent. Conversion=72%, Mn=19032 g/mol, PDI=1.06.

Example 10

L-LA (266 mg, 1.9 mmol), (−)-sparteine (2.2 microliter, 0.009 mmol) and 4-HFA-Tol (12 mg, 0.046 mmol) were dissolved in $CH_2Cl_2$ (1.56 g). The mixture was allowed to dissolve for two minutes in a screwed capped vial before the addition of benzyl alcohol (1.0 microliter, 0.009 mmol). M/C=41. M/I=211. The polymerization was followed by $^1$H-NMR and stopped after 121.25 hours by ultra-fast evaporation of the solvent. Conversion=14.8%, MnSEC=4385 g/mol, PDI=1.08.

Examples 11 and 12 were performed in bulk.

Example 11

Polymerization in Bulk at 100° C. (DP=20)

L-LA (100 mg, 0.7 mmol), (−)-sparteine (8.1 microliter, 0.034 mmol), 1,3-HFAB (71 mg, 0.17 mmol) and benzyl alcohol (3.7 microliter, 0.032 mmol) were combined in a screw vial. M/C=4.1. M/I=22. The vial was immersed in an oil bath maintained at 100° C. The polymerization was stopped after 15 minutes by cooling down the mixture. Conversion=80%.

Example 12

Polymerization in Bulk at 100° C. (DP=500)

L-LA (600 mg, 4.2 mmol), (−)-sparteine (2 microliter, 0.009 mmol), 1,3-HFAB (17 mg, 0.041 mmol) and benzyl alcohol (1.0 microliter, 0.0092 mmol) were combined in a screw vial. M/C=100. M/I=456. The vial was immersed in an oil bath maintained at 100° C. The polymerization was stopped after 16 hours by cooling down the mixture. Conversion=45%, MnSEC=28,000 (bimodal with another Mp 8250).

Examples 13 to 15 were performed using D,L-Lactide (D,L-LA).

Example 13

Polymerization in Deuterated Chloroform at Ambient Temperature (DP=100)

D,L-LA (266 mg, 1.9 mmol), (−)-sparteine (4.3 microliter, 0.018 mmol) and 3,5-HFA-MA (42 mg, 0.084 mmol) were dissolved in $CDCl_3$ (0.75 g). The mixture was allowed to dissolve for two minutes in a screwed capped vial before the addition of benzyl alcohol (2.0 microliter, 0.018 mmol). M/C=23. M/I=105. The polymerization was followed by $^1$H-NMR and stopped after 512 minutes by ultra-fast evaporation of the solvent. Conversion=26%, MnSEC=6600 g/mol, PDI=1.06.

Example 14

Polymerization in Deuterated Chloroform at 50° C. (DP=100)

D,L-LA (266 mg, 1.9 mmol), (−)-sparteine (4.3 microliter, 0.018 mmol) and 3,5-HFA-MA (42 mg, 0.084 mmol) were dissolved in $CDCl_3$ (0.75 g). The mixture was allowed to dissolve for two minutes in a screwed capped vial before the addition of benzyl alcohol (2.0 microliter, 0.018 mmol). M/C=23. M/I=105. The polymerization was performed at 50° C. After 140 minutes, the polymer is precipitated into cold methanol (5 ml), filtered, and dried until constant weight. Yield=71.4%, MnSEC=4800 g/mol, PDI=1.33.

Example 15

Polymerization in Dichloromethane at Ambient Temperature (DP=375)

D,L-LA (500 mg, 3.9 mmol), (−)-sparteine (11 microliter, 0.047 mmol) and 3,5-HFA-MA (21 mg, 0.042 mmol) were dissolved in $CH_2Cl_2$ (2.9 g). The mixture was allowed to dissolve for two minutes in a screwed capped vial before the addition of benzyl alcohol (1.0 microliter, 0.009 mmol). M/C=93. M/I=433. The polymerization was stopped after 47 hours by ultra-fast evaporation of the solvent. Conversion=Not determined (ND), MnSEC=17500 g/mol, PDI=1.09.

Examples 16 to 20 were performed using beta-butyrolactone (BL).

Example 16

Polymerization in Deuterated Benzene at 50° C. (DP=100)

BL (680 mg, 7.8 mmol), (−)-sparteine (18.7 microliter, 0.079 mmol) and 3,5-HFA-MA (180 mg, 0.36 mmol) were dissolved in $C_6D_6$ (0.131 g). The mixture was allowed to dissolve for two minutes in a screwed capped vial before the addition of benzyl alcohol (8.6 microliter, 0.077 mmol). M/C=21.6. M/I=101. The polymerization was performed at 50° C., followed by $^1$H-NMR and stopped after 138 hours by precipitation in cold pentane. Conversion=71%, MnSEC=6500 g/mol, PDI=1.07.

Example 17

Polymerization in Deuterated Benzene at 50° C. (DP=500)

BL (680 mg, 7.8 mmol), (−)-sparteine (18.7 microliter, 0.079 mmol) and 3,5-HFA-MA (180 mg, 0.36 mmol) were dissolved in $C_6D_6$ (0.131 g). The mixture was allowed to dissolve for two minutes in a screwed capped vial before the addition of benzyl alcohol (1.7 microliter, 0.016 mmol). M/C=22. M/I=487. The polymerization was performed at 50° C., followed by $^1$H-NMR and stopped after 357 hours by precipitation in cold pentane. Conversion=ND, MnSEC=10645 g/mol, PDI=1.1.

Example 18

Polymerization in Deuterated Benzene at 50° C. (DP=500)

BL (680 mg, 7.8 mmol), (−)-sparteine (4 microliter, 0.017 mmol) and 3,5-HFA-MA (36 mg, 0.072 mmol) were dissolved in $C_6D_6$ (0.3 g). The mixture was allowed to dissolve for two minutes in a screwed capped vial before the addition of alpha-methyl, omega-hydroxyl poly(ethylene oxide) (PEO-OH, Mn=5000) (80 mg, 0.016 mmol). M/C=108. M/I=487. The polymerization was performed at 50° C., followed by $^1$H-NMR and stopped after 448.41 hours by precipitation in cold diethylether. Conversion=54.6%, MnSEC=7300 g/mol, PDI=1.05.

Example 19

Polymerization in Deuterated Benzene at 50° C. (DP=50)

BL (680 mg, 7.8 mmol), (−)-sparteine (37.5 microliter, 0.16 mmol) and NFTB (378 mg, 1.6 mmol) were dissolved in $C_6D_6$ (0.2 g). The mixture was allowed to dissolve for two minutes in a screwed capped vial before the addition of benzyl alcohol (17 microliter, 0.154 mmol). M/C=4.87 M/I=51. The polymerization was performed at 50° C., followed by $^1$H-NMR and stopped after 67 hours by precipitation in cold petroleum ether. Conversion=65.7%, MnSEC=ND, PDI=ND.

Example 20

Polymerization in Deuterated Benzene at 50° C. (DP=200)

BL (400 mg, 4.6 mmol), (−)-sparteine (5.4 microliter, 0.02 mmol) and 1,3-HFAB (84 mg, 0.2 mmol) were dissolved in $C_6D_6$ (0.1 g). The mixture was allowed to dissolve for two minutes in a screwed capped vial before the addition of benzyl alcohol (2.5 microliter, 0.02 mmol). M/C=23. M/I=230. The polymerization was performed at 50° C., followed by $^1$H-NMR and stopped after 39.3 hours by ultra-fast evaporation. Conversion=56.4%, MnSEC=ND, PDI=ND.

The results are summarized in Table 6. [I]/[C] is the molar concentration ratio of initiator (benzyl alcohol), [I], to catalyst, [C].

TABLE 6

| Ex | Monomer | Catalyst | [M]/[I] | [I]/[C] | Temp. [° C.] | Polym. Time [h] | Conv. [%] | M$_n$SEC [g/mol] | PDI |
|---|---|---|---|---|---|---|---|---|---|
| 1 | L-LA | 3,5-HFA-MA | 211 | 1/1 | ambient | 91 | 68 | 21255 | 1.09 |
| 2 | L-LA | 3,5-HFA-St | 211 | 1/1 | ambient | 91 | 95 | 27458 | 1.08 |
| 3 | L-LA | 3,5-HFA-St | 222 | 1/1 | ambient | 91 | 54 | 20289 | 1.09 |
| 4 | L-LA | NFTB | 211 | 1/5 | ambient | 143 | 0 | NA | NA |
| 5 | L-LA | HFTB | 211 | 1/5 | ambient | 71.2 | 88 | 30479 | 1.12 |
| 6 | L-LA | HFTB | 211 | 1/5 | ambient | 26 | 12.7 | 3252 | 1.08 |
| 7 | L-LA | HFIP | 211 | 1/5 | ambient | 23 | 91 | 12864 | 1.28 |
| 8 | L-LA | 1,4-HFAB | 211 | 1/5 | ambient | 72 | 29.6 | 5905 | 1.07 |
| 9 | L-LA | 1,3-HFAB | 211 | 1/5 | ambient | 47.33 | 72 | 19032 | 1.06 |
| 10 | L-LA | 4-HFA-Tol | 211 | 1/5 | ambient | 121.25 | 14.8 | 4385 | 1.08 |
| 11 | L-LA | 1,3-HFAB | 22 | 1/5 | ambient | 0.25 | 80 | ND | ND |
| 12 | L-LA | 1,3-HFAB | 456 | 1/5 | 100 | 16 | 45 | 28000 | ND |
| 13 | D,L-LA | 3,5-HFA-MA | 105 | 1/5 | 100 | 8.5 | 26 | 6600 | 1.06 |
| 14 | D,L-LA | 3,5-HFA-MA | 105 | 1/5 | ambient | 2.5 | 71.4 | 4800 | 1.33 |
| 15 | D,L-LA | 3,5-HFA-MA | 433 | 1/5 | 50 | 47 | ND | 17500 | 1.09 |
| 16 | BL | 3,5-HFA-MA | 101 | 1/5 | ambient | 138 | 71 | 6500 | 1.07 |
| 17 | BL | 3,5-HFA-MA | 487 | 1/20 | 50 | 357 | ND | 10645 | 1.1 |
| 18 | BL | 3,5-HFA-MA | 487 | 1/5 | 50 | 448 | 54.6 | 7300 | 1.05 |
| 19 | BL | NFTB | 51 | 1/10 | 50 | 67 | 65.7 | ND | ND |
| 20 | BL | 1,3-HFAB | 230 | 1/10 | 50 | 39.3 | 56.4 | ND | ND |

ND = Not determined

Additional examples conducted at ambient temperature are listed Table 7. The polymerization time, initiator:catalyst concentration ratio, and target DP were varied for each catalyst.

TABLE 7

| Ex. | Monomer | Catalyst | [M]/[I] | [I]/[C] | Time [h] | Conv. [%] | MnSEC [g/mol] | PDI |
|---|---|---|---|---|---|---|---|---|
| 21 | D,L-LA | 3,5-HFA-MA | 100 | 1/0 | 24 | 0 | — | — |
| 22 | D,L-LA | 3,5-HFA-MA | 375 | 1/1 | 19.5 | ND | 14248 | 1.19 |
| 23 | L-LA | 3,5-HFA-MA | 200 | 1/1 | 3.25 | 3.26 | — | — |
| 24 | L-LA | 3,5-HFA-MA | 200 | 1/1 | 19.6 | 12.96 | 4907 | 1.05 |
| 25 | L-LA | 3,5-HFA-MA | 200 | 1/1 | 52.25 | 46.8 | 15286 | 1.09 |
| 26 | L-LA | 3,5-HFA-St | 200 | 1/1 | 3.25 | 4.22 | — | — |
| 27 | L-LA | 3,5-HFA-St | 200 | 1/1 | 19.6 | 21 | 5855 | 1.05 |

TABLE 7-continued

| Ex. | Monomer | Catalyst | [M]/[I] | [I]/[C] | Time [h] | Conv. [%] | MnSEC [g/mol] | PDI |
|---|---|---|---|---|---|---|---|---|
| 28 | L-LA | 3,5-HFA-St | 200 | 1/1 | 52.25 | 73.1 | 25943 | 1.07 |
| 29 | L-LA | 4-HFA-St | 200 | 1/1 | 3.25 | 2.13 | — | — |
| 30 | L-LA | 4-HFA-St | 200 | 1/1 | 19.6 | 5.84 | 2570 | 1.1 |
| 31 | L-LA | 4-HFA-St | 200 | 1/1 | 52.25 | 27.07 | 11791 | 1.07 |
| 32 | L-LA | 1,4-HFAB | 200 | 1/5 | 2.1 | 3.6 | — | — |
| 33 | L-LA | 1,4-HFAB | 200 | 1/5 | 6.7 | 8.2 | 2640 | 1.08 |
| 34 | L-LA | 1,4-HFAB | 200 | 1/5 | 23.83 | 20.7 | 5093 | 1.08 |
| 35 | L-LA | 1,4-HFAB | 200 | 1/5 | 47.33 | 26.4 | 5856 | 1.08 |
| 36 | L-LA | 1,3-HFAB | 200 | 1/5 | 2.1 | 6.5 | — | — |
| 37 | L-LA | 1,3-HFAB | 200 | 1/5 | 6.7 | 16.8 | 6210 | 1.05 |
| 38 | L-LA | 1,3-HFAB | 200 | 1/5 | 23.83 | 51.7 | 15487 | 1.07 |
| 39 | L-LA | 1,3-HFAB | 200 | 1/5 | 33.09 | 66.1 | 16276 | 1.06 |
| 40 | D,L-LA | 1,3-HFAB | 1000 | 1/10 | 19.25 | 55 | 43000 | 1.13 |
| 41 | D,L-LA | 1,3-HFAB | 1000 | 1/10 | 6.7 | 16.8 | 6210 | 1.05 |
| 42 | L-LA | 4-HFA-Tol | 200 | 1/5 | 5.33 | 3.6 | — | — |
| 43 | L-LA | 4-HFA-Tol | 200 | 1/5 | 26.42 | 8.6 | 2637 | 1.11 |
| 44 | L-LA | 4-HFA-Tol | 200 | 1/5 | 48.83 | 11.64 | 3696 | 1.08 |
| 45 | L-LA | HFTB | 200 | 1/5 | 2.33 | 6.3 | — | — |
| 46 | L-LA | HFTB | 200 | 1/5 | 6.88 | 10.26 | 4410 | 1.07 |
| 47 | L-LA | HFTB | 200 | 1/5 | 23 | 23 | 9467 | 1.06 |
| 48 | L-LA | HFTB | 200 | 1/5 | 49.75 | 75 | 22356 | 1.09 |
| 49 | L-LA | HFIP | 200 | 1/5 | 2.33 | 27 | 4793 | 1.16 |
| 50 | L-LA | HFIP | 200 | 1/5 | 4.83 | 44.5 | 6509 | 1.16 |
| 51 | MODC-E | 1,3-HFAB | 100 | 1/5 | 7.5 | 50.7 | 2084 | 1.13 |
| 52 | MODC-E | 1,3-HFAB | 100 | 1/5 | 22.5 | 88.1 | 3150 | 1.13 |

Figure 4:
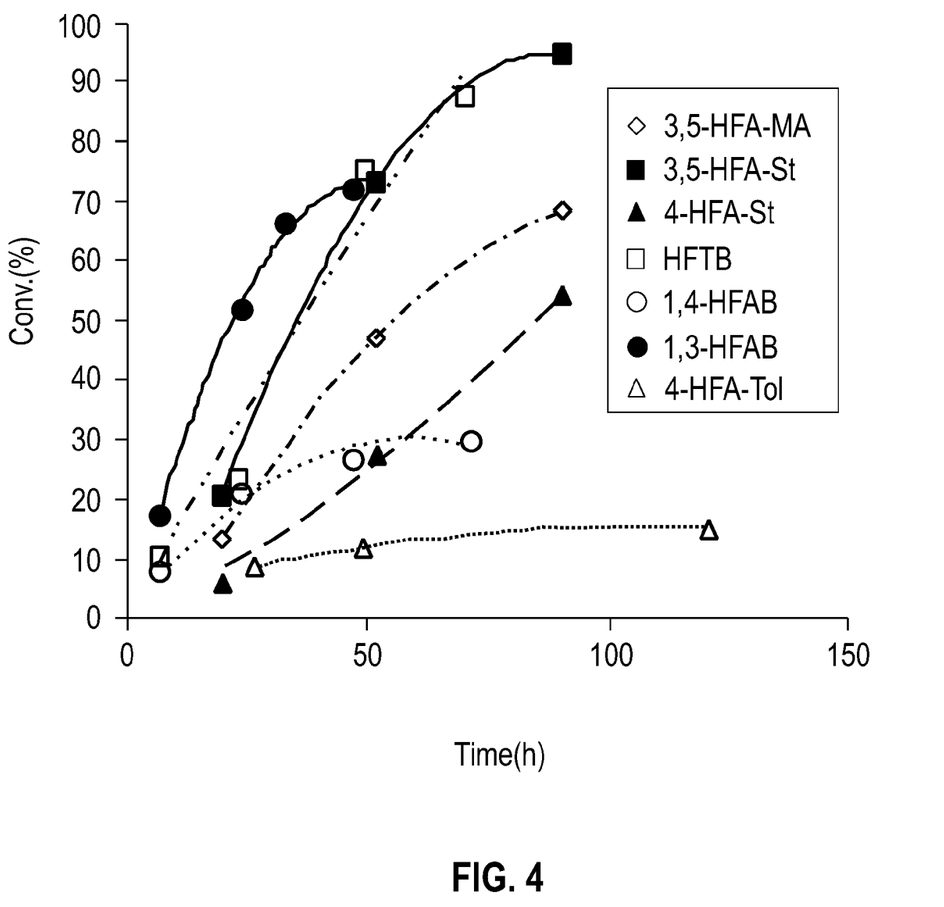
FIG. 4 is a graph of the % conversion versus Time curves obtained from ring-opening polymerizations of lactide (LA) in $CH_2Cl_2$ at ambient temperature ($[LA]_0/[BzOH]_0/[S]_0/[catalyst]_0$=200/1/1/5; $[LA]_0$=1 M).

The supramolecular assisted ring opening polymerization of LA with the BzOH/sparteine/catalyst system was evaluated for all catalysts and their activities were assessed for identical conditions. For this purpose, polymerizations were conducted in $CH_2Cl_2$ at ambient temperature for a monomer/initiator/base/catalyst ratio, [LA]/[BzOH]/[S]/[catalyst], equal to 200/1/1/5 with [LA]=1.0 M. The relative conversions were determined time-to-time by means of $^1$H-NMR spectroscopy (FIG. 4).

Accordingly, 1,3-HFAB, HFTB and 3,5-HFA-St proved to be more active than 3,5-HFA-MA, 4-HFA-St, 1,4-HFAB and 4-HFA-Tol. The NFTB catalyst did not allow any polymerization. HFIP can be an initiator and a catalyst, which is less desirable.

Figure 5:
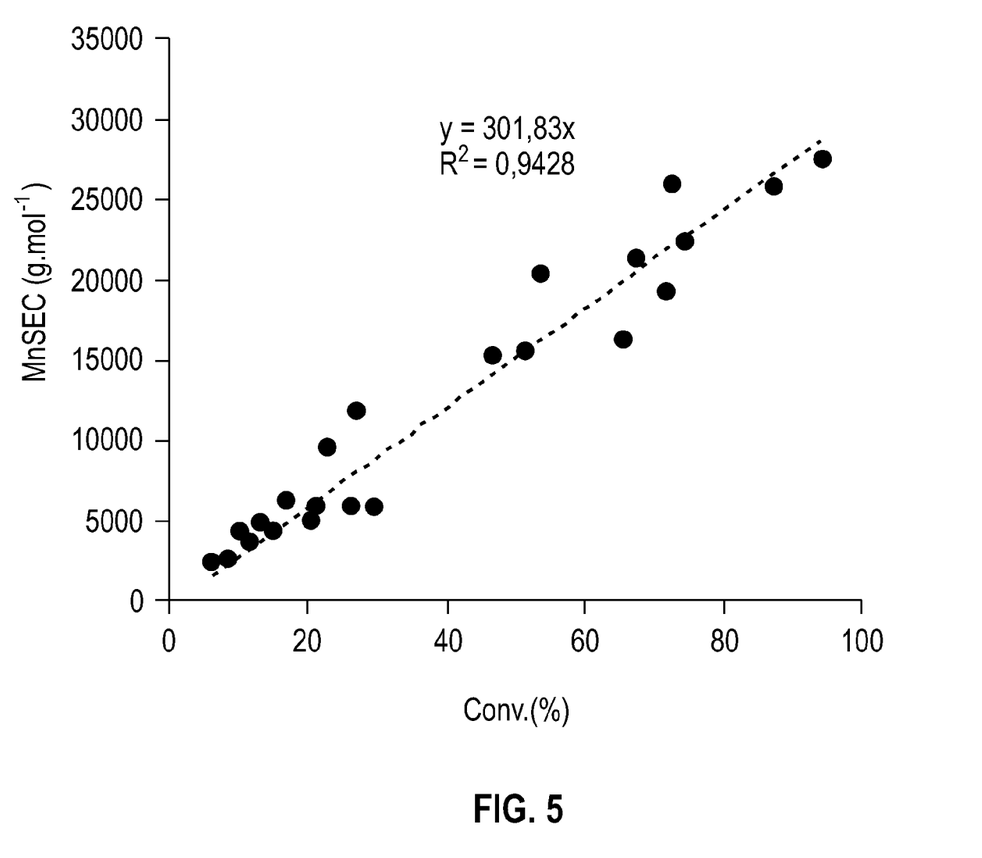
FIG. 5 is a graph of $M_n$ (estimated by SEC) versus lactide (LA) conversion (estimated by $^1$H-NMR) ($CH_2Cl_2$, ambient temperature, $[LA]_0$=1 M, $[LA]_0/[BzOH]_0/[S]_0/[catalyst]_0$=200/1/1/5).

The experimental number average molecular weight determined by SEC, or $M_n$SEC, values obtained for each catalyst varied linearly with the conversion percentage as shown in FIG. 5.

Comparative Example A (1)

Table 8 compares the results of polymerizations using 1,3-HFAB, HFTB or 3,5-HFA-St/BzOH sparteine combinations (Ex. 9, 5, and 2 respectively) with thiourea (1) of Comparative Example A (Comp. A), as reported in the literature. In particular, Ex. 2 using 3,5-HFA-St was comparable in yield, PDI, and percent conversion to Comp. A, but had a shorter reaction time and required half the level of catalyst relative to Comp. A.

TABLE 8

Properties of Poly(L-lactide)s obtained from different catalysts[a]

| | Catalyst | [M]/[I] | [I]/[C] | Time [h] | Conv. [%][c] | $M_n$SEC [g·mol$^{-1}$][c] | PDI[c] |
|---|---|---|---|---|---|---|---|
| Ex. 9 | 1,3-HFAB | 211 | 1/5 | 47 | 72 | 19000 | 1.06 |
| Ex. 5 | HFTB | 211 | 1/5 | 72 | 88 | 26000 | 1.12 |
| Ex. 2 | 3,5-HFA-St | 211 | 1/1 | 91 | 95 | 28000 | 1.07 |
| Comp. A | Thiourea (1)[b] | | | 105 | 98 | 42000 | 1.05 |

[a][LA]$_0$/[BzOH]$_0$/[S]$_0$ = 200/1/1; [LA]$_0$ = 1.0M; 2.5 mol % of catalyst

[b]See A. P. Dove, R. C. Pratt, B. G. G. Lohmeijer, R. M. Waymouth, J. L. Hedrick, J. Am. Chem. Soc. 2005, 127, 13798-13799; 5 mol % of catalyst

[c]Determined by size exclusion chromatography in THF at 27° C.

Living Polymerization.

To assess the "livingness" of this supramolecular process, the polymerization of D,L-LA was initiated in $CH_2Cl_2$ at ambient temperature for a [D,L-LA]/[BzOH]/[S]/[1,3-HFAB] equal to 1000/1/10/100 ([LA]=4.8 M).

Two chain-extension experiments were successfully performed from an initial polymerization ([D,L-LA]$_0$=2.95 M; [BzOH]$_0$=5.9×10$^{-3}$ M; [1,3-HFAB]=0.3 M; [S]=3×10$^{-2}$ M) carried out at ambient temperature for 19 hours to give polylactide of $M_n$=43000 g/mol (PDI=1.13), as determined by SEC (relative to PS standards). D,L-LA (3.5×10$^{-3}$ mol) was added to this solution and the solution was allowed to react for an additional 23 h. The molecular weight of the sample increased to 99000 g/mol (PDI=1.15). This solution was charged again with 4.2×10$^{-3}$ mol of D,L-LA and slightly diluted by 1 ml of $CH_2Cl_2$. After 71 hours, the final molecular weight increased to $M_n$=114,000 g/mol with no real change in the polydispersity (1.09). Thus, this system exhibits the characteristics of a living polymerization even if some deviations have been observed for high targeted degree of polymerization (DP 1000).

The singular forms "a," "an," and "the" include plural referents unless the context clearly dictates otherwise. The endpoints of all ranges directed to the same characteristic or component are independently combinable and inclusive of the recited endpoint.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   reacting, to form a polymer by ring-opening polymerization, a mixture comprising:
   a monomer,
   an accelerator in an amount of 0.1 to 5 mol %,
   an initiator in an amount of 0.1 to 5 mol %, and
   a catalyst comprising one or more 1,1,1,3,3,3-hexafluoropropan-2-ol-2-yl groups in an amount of 1 to 5 mol %,
   wherein the mol % are based on moles of the monomer.

2. The method of claim 1, wherein the mixture further comprises a solvent.

3. The method of claim 1, wherein the mixture is free of a solvent.

4. The method of claim 1, wherein the catalyst is of formula (1)

$$R^1—C(CF_3)_2OH \qquad (1),$$

wherein $R^1$ represents a hydrogen or a substituent having from 1 to 20 carbons selected from the group consisting of alkyl group, substituted alkyl group, cycloalkyl group, substituted cycloalkyl group, heterocycloalkyl group, substituted heterocycloalklyl group, aryl group, substituted aryl group, and combinations thereof.

5. The method of claim 1, wherein the catalyst is of formula (2):

wherein $R^2$ is a bridging group having a valence of 2 containing from 1 to 20 carbons selected from the group consisting of an alkylene group, a substituted alkylene group, a cycloalkylene group, substituted cycloalkylene group, a heterocycloalkylene group, substituted heterocycloalkylene group, an arylene group, a substituted arylene group, and combinations thereof.

6. The method of claim 1, wherein the catalyst is selected from the group consisting of 4-HFA-St, 4-HFA-Tol, HFTB, NFTB, HFIP, 3,5-HFA-MA, 3,5-HFA-St, 1,3-HFAB, 1,4-HFAB, and combinations thereof.

7. The method of claim 1, wherein the one or more 1,1,1,3,3,3-hexafluoropropan-2-ol-2-yl groups are bound to a support by a linking group.

8. The method of claim 7, wherein the linking group comprises a $C_1$-$C_{12}$ alkyl group, $C_1$-$C_{12}$ heteroalkyl group, ether group, thioether group, amino group, ester group, amide group, or a combination of the foregoing linking groups.

9. The method of claim 7, wherein the support comprises a polymer, a crosslinked polymer bead, an inorganic particle, or a metallic particle.

10. The method of claim 1, wherein the monomer is a cyclic ester.

11. The method of claim 10, wherein the cyclic ester is selected from the group consisting of lactide, beta-butyrolactone, gamma-butyrolactone, gamma-valerolactone, delta-valerolactone, epsilon-caprolactone, and combinations thereof.

12. The method of claim 1, wherein the monomer is a cyclic carbonate.

13. The method of claim 10, wherein the cyclic carbonate is selected from the group consisting of trimethylenecarbonate, tetramethylene carbonate, pentamethylene carbonate, MODC-A, MODC-M, MODC-TB, MODC-E, and combinations of the foregoing cyclic carbonates.

14. The method of claim 1, wherein reacting is at a temperature of from 15° C. to 200° C.

15. A polymer formed by the method of claim 1, comprising a residual amount greater than 0 wt % of the catalyst.

16. The polymer of claim 15, wherein the polymer has a polydispersity index of 1.01 to 1.35.

17. The polymer of claim 15, wherein the polymer is polylactide or poly(3-hydroxybutyrate), and the polymer has a tacticity which is isotactic, atactic, or syndiotactic.

18. An article comprising the polymer of claim 15.

19. A method, comprising:
   reacting, to form a polymer by ring-opening polymerization, a mixture comprising:
   a cyclic ester and/or cyclic carbonate monomer,
   0.1 to 5.0 mol % a nitrogen base accelerator,
   0.1 to 5.0 mol % an alcohol initiator based on an equivalent molecular weight per hydroxyl group in the alcohol initiator, and
   1 to 5 mol % of a catalyst comprising one or more 1,1,1,3,3,3-hexafluoropropan-2-ol-2-yl groups;
   wherein mol % is based on moles of the monomer.

* * * * *